April 30, 1946. V. E. BRUNAMONTI 2,399,163
BARBECUE MACHINE
Filed Feb. 29, 1944 3 Sheets-Sheet 3

Inventor
Valerio E. Brunamonti

By William Cleland
Attorney

Patented Apr. 30, 1946

2,399,163

UNITED STATES PATENT OFFICE 2,399,163

BARBECUE MACHINE

Valerio E. Brunamonti, Lakemore, Ohio

Application February 29, 1944, Serial No. 524,393

3 Claims. (Cl. 99—421)

This invention relates to barbecue machines.

A general object of this invention is to provide a machine having improved means for rotatably and adjustably supporting meats, such as chickens, hams, etc., in horizontally and vertically spaced rows in front of a heat unit, the arrangement being such that the meats are cooked uniformly in different lengths of time according to the distance from the heat unit.

A more particular object of the invention is to provide improved means for rotatably supporting the meats in rows whereby the supports are readily adjustable to different distances from the heat unit without necessarily stopping the driving means for rotating the supports.

Another object is to provide a barbecue machine in which heat loss to the exterior thereof is greatly minimized.

Another object of the invention is to provide a barbecue machine of the type utilizing a coal, charcoal or like grate and which necessarily has a substantial opening in the front thereof, with means operable when the fuel is ignited for preventing escape of smoke and fumes through said opening.

Still another object of the invention is to provide in a barbecue machine an improved grate which facilitates stirring a coal or like fire therein, and improved quickly releasable means for dumping the fire when desired.

These and other objects of the invention will be manifest from the following brief description and the acompanying drawings.

Figure 1:
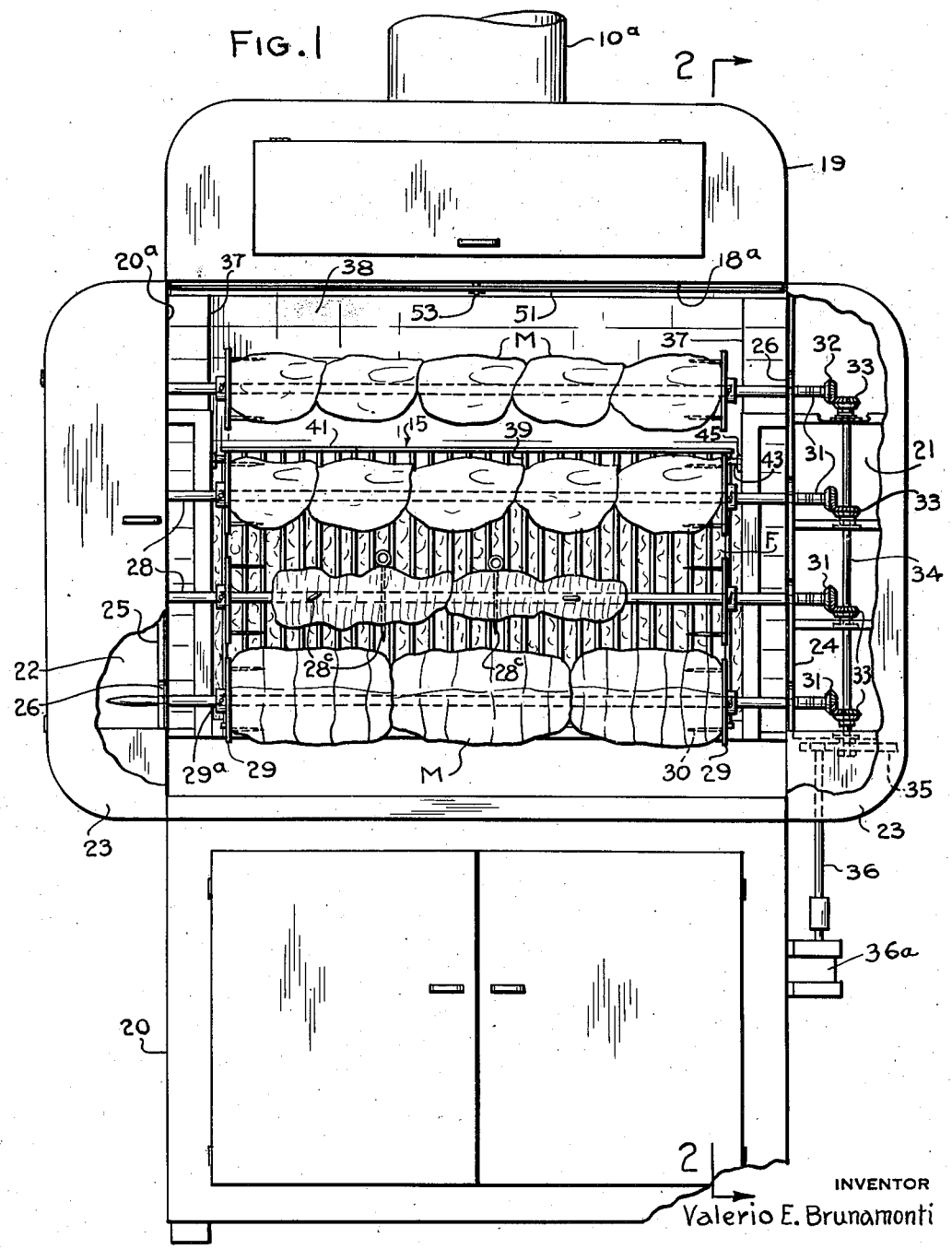
Figure 1 is a front elevation, partly broken away, of a barbecue machine embodying the invention.

Referring to Figures 1, 2, 3 and 4 of the drawings, the numeral 10 particularly designates a casing defined by front, back, side and top walls 11, 12, 13 and 14, respectively, within which casing is supported a heat unit 15, of the combustible fuel type, to be described later. The walls of casing 10 may be lined as indicated at 16, 16, with heat insulating material to minimize the amount of heat carried to the exterior of the apparatus. A conduit or draft pipe indicated at 10a, is provided at the top of casing 10 to carry off smoke, excess heat and fumes.

Forwardly adjoining casing 10, and surrounding a rectangular opening 18a in front wall 11 thereof, opposite said heat unit, may be a hollow frame or casing 18 providing top and bottom insulating air chambers 19 and 20, which may be utilized for food warming space, and similar side chambers 21 and 22, the interior of which are accessible through front doors 23, 23.

The inner walls 24, 25 of side chambers 21 and 22 may have therein a plurality of corresponding oppositely aligned, vertically spaced slots 26, 26 open at the front ends thereof when doors 23 are open. On the bottom edges of each of the slots 26 may be a plurality of spaced notches 27, 27 for rotatably receiving reduced portions 28a and 28b of meat supporting elements or spits 28, the arrangement being such that the spits may be interchangeably received through slots 26 and received in corresponding pairs of notches 27 in opposite walls, whereby meat on the spits, as indicated at M in Figure 1, may be barbecued or roasted in different lengths of time according to the distances of the spits from heat unit 15.

Slidably and removably mounted on each spit 28 may be a pair of spaced bars 29, 29, each having thereon inwardly extending pins 30, 30 for engaging opposite ends of rows of meat M received thereon to prevent relative rotation of the meat on the spit as it is rotated. The bars 29 are fixed in adjusted position as by means of set screws 29a. In addition, pins or skewers 28c are insertable through the meat and selectively through a series of apertures arranged in the spit 28 in spaced, staggered relation.

For continuously rotating the spits 28, they may have extensions 31 at one end to project into chamber 21, and bevel gears 32 fixed at the ends of these extensions for meshing with bevel gears 33 keyed in spaced relation on spaced vertical shafts 34, 34 driven by a train of gears 35, in turn driven, through shaft 36 and reducer 36a, by a suitable motor (not shown).

Figure 4:
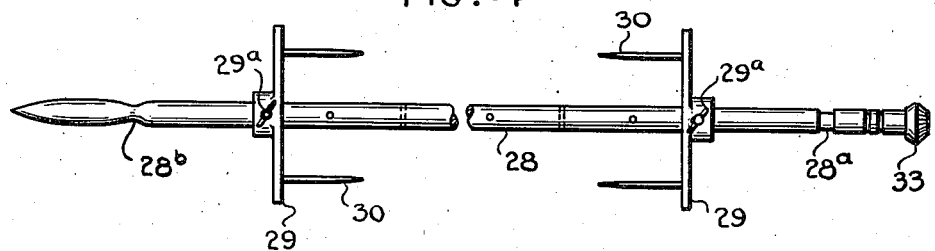
Figure 4 is an enlarged detail view, partly broken away, of one of the rotable meat supporting elements or spears removed from the machine.

The spits are selectively insertable in any pair of slots 26 as previously described, with the bevel gears 32 removably engaging corresponding driven gears 33 to rotate the spits. The portions of extensions 31 between gears 32 and wall 24 may be utilized as handles. The opposite ends of the spits, which extend into chamber 25, are pointed as shown in Figure 4 for piercing through the meat, and from this end the adjacent bars 29 are removable to permit insertion and removal of the spit through the meat.

The heat unit 15 is of the type which utilizes combustible fuel, preferably coal or charcoal, and comprises a fire box 35 of fire brick of known type and a grate 36b. The firebox may have spaced side walls 37, 37 and a rear wall 38, that is, it is open at the top and bottom and at the front. The grate may be composed of laterally spaced vertical bars 39, 39, spaced from rear wall 38 and having rearward extensions 40 at the lower ends thereof, in the manner of the letter L, the top ends of the bars being connected to a cross-bar 41 and bottom ends being connected to a cross-bar 42. Pins 43, 43 on the extreme end bars 39 adjacent the upper ends thereof are removably received in slots 44 in the upper edges of plates 45 secured to the side walls 37, whereby the grate is swingable from the full line position shown in Figure 2, to a dumping position as shown in chain-dotted lines. To permit swinging the grate to this position, it is relatively narrower than the width of opening 18a. The grate is releasably held in said full line position by means of latches 46, 46 pivoted to said extreme end bars 39, adjacent the bottom thereof, these latches having notches 47 in the bottom edges for receiving pins 48, 48 in said side walls 37. The extensions 40 support fuel F, retained by the walls of the fire box and the vertical bars 39. The arrangement is such that a fire-stirring poker or the like may be vertically reciprocated between the vertical bars from beneath the extensions 40, there being no connecting structure between the bars forwardly of rear wall 38, and between upper and lower cross-bars 41 and 42.

A space 50 between the rear wall 38 of the fire box and rear wall 12 of casing 10, provides additional heat insulation at the rear of the heat unit 15.

Figure 2:
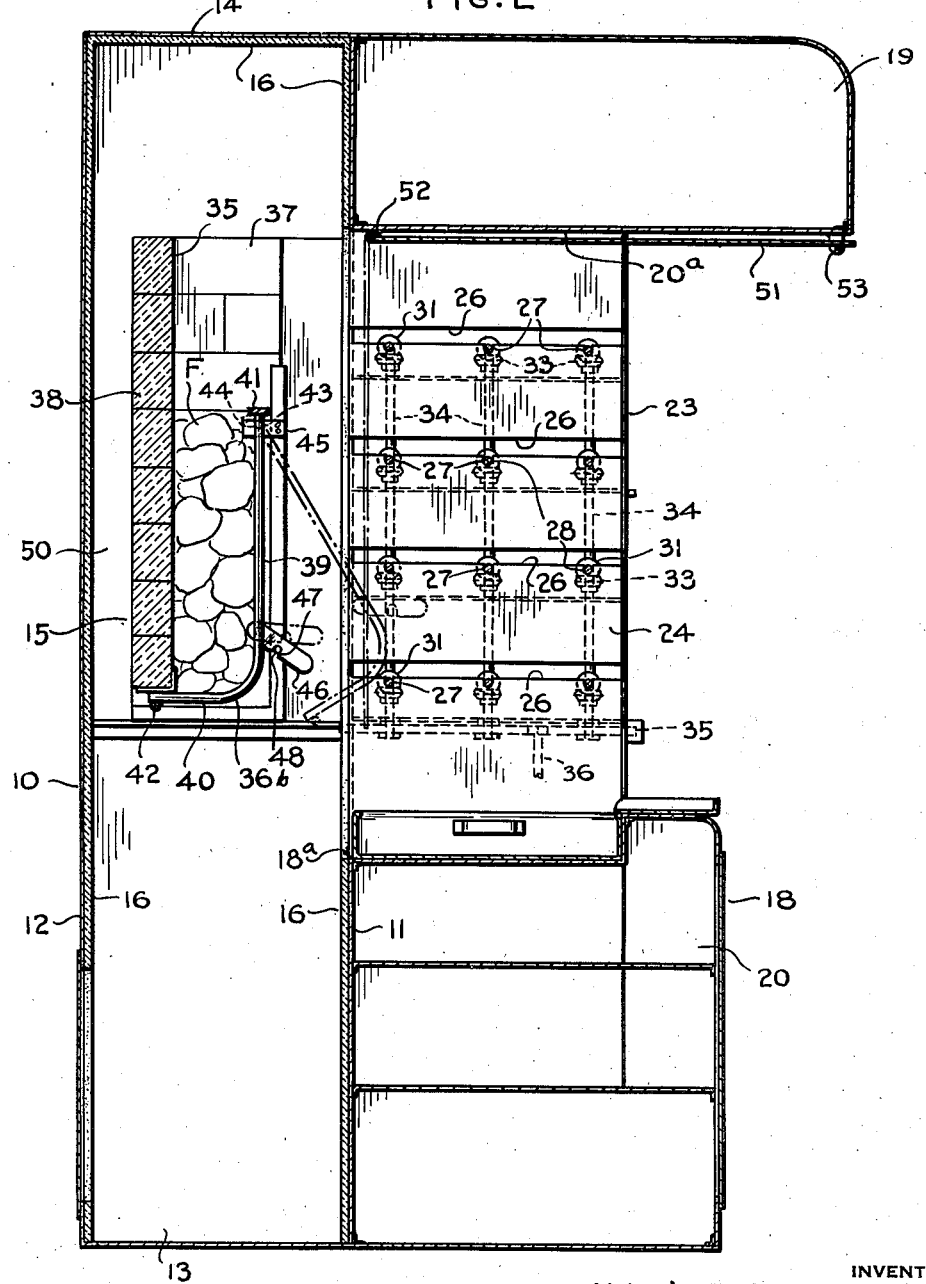
Figure 2 is a cross-section taken substantially on line 2—2 of Figure 1.
Figure 3:
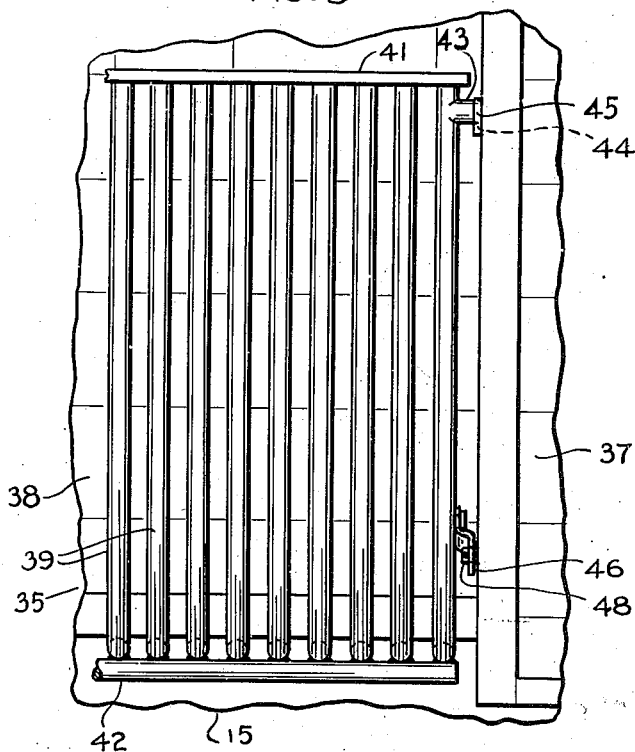
Figure 3 is an enlarged fragmentary view of the heat unit.

When a fire is first started in heat unit 15 smoke and fumes are prevented from reaching the exterior of the machine by means of a baffle plate or shield 51 pivoted at 52 to casing 18, at the top of opening 18a, as shown in chain-dotted lines in Figure 2. The plate 51 in this position extends to a point adjacent the bottom of grate 36b, sufficient space being provided below the plate to provide draft for the fire. The plate is only required for a short time until the fire gets sufficiently hot, when it may be secured by means of a releasable catch 53, in the out-of-the-way position shown in full lines (Figure 2).

In the operation of the apparatus, after the fire has been started as described above, the motor (not shown) is started, to drive the shafts 34 and gears 33 continuously. With the doors 23 open loaded spits 28 may be arranged as desired by sliding them along the slots 26 to engage the reduced portions 28a and 28b in cooperating notches 27, with the gears 32 in mesh with corresponding driven gears 33. Doors 23 are kept closed after the spits are in position. Thus the spits will be continuously rotated in front of the fire, and meat on the spits of the vertical rows will be uniformly cooked in different lengths of time according to the distances thereof from the fire. The air-insulated casing around the meats being treated is important particularly in effecting uniform roasting and browning at all points along the spits. The spits are readily interchangeable without stopping the driving mechanism.

Modification of the invention may be resorted to without departing from the spirit thereof or the scope of the appended claims.

What is claimed is:

1. A barbecue machine comprising a casing, a heat unit in said casing, said casing having an opening therein in front of said heat unit, a heat retaining frame of substantial width around said opening including walls at opposite sides of the opening, said opening communicating with the exterior through said frame, a series of horizontally extending vertically spaced slots in said walls, said slots being open at the front of the frame, a plurality of horizontally spaced notches in the lower edges of each of said slots, a plurality of meat-supporting elements to be rotatably received in said notches to extend between said walls in horizontally spaced series, said elements being selectively insertable through the open ends of said spaced slots and being interchangeably receivable in said spaced notches thereof, and power driven means at one side of said opening and including a plurality of gears, said supporting elements having gears thereon for selective meshing engagement with the gears of said driven means to rotate the elements in said notches.

2. A barbecue machine comprising a casing, a heat unit in said casing, said casing having an opening therein in front of said heat unit, a heat-retaining frame of substantial width around said opening including walls at opposite sides of the opening, said opening communicating with the exterior through said frame, said heat-retaining frame being hollow to provide substantially closed insulating air space or spaces around said opening, a series of horizontally extending vertically spaced slots in said walls, said slots being open at the front of the frame, a plurality of horizontally spaced notches in the lower edges of each of said slots, a plurality of meat-supporting elements to be rotatably received in said notches to extend between said walls in horizontally spaced series, said elements being selectively insertable through the open ends of said spaced slots and being interchangeably receivable in said spaced notches thereof, and power driven means at one side of said opening and including a plurality of gears, said supporting elements having gears thereon for selective meshing engagement with the gears of said driven means to rotate the elements in said notches.

3. A barbecue machine comprising a casing, a heat unit in said casing, said casing having an opening therein in front of said heat unit, a heat retaining frame of substantial width around said opening including walls at opposite sides of the opening, said opening communicating with the exterior through said frame, said heat retaining frame being hollow to provide substantially closed insulating air space or spaces around said opening, a series of horizontally extending vertically spaced slots in said walls, a plurality of horizontally spaced notches in the lower edges of each of said slots, a plurality of removable meat-supporting elements selectively positioned in said slots and rotatably received in said notches to extend between said walls in spaced series, said elements being interchangeably receivable in said spaced notches, and power driven means at one side of said opening and including a plurality of gears, said supporting elements having gears thereon for selective meshing engagement with the gears of said driven means to rotate the elements in said notches.

VALERIO E. BRUNAMONTI.